Feb. 2, 1926.

W. S. LUDLOW, JR 1,571,209

SIGNAL SERVICE

Filed July 24, 1922

Inventor
Walter S. Ludlow, Jr.,
By Wood + Wood
Attorneys

Feb. 2, 1926.  
W. S. LUDLOW, JR  
SIGNAL SERVICE  
Filed July 24, 1922

Inventor:
Walter S. Ludlow, Jr.,
By Wood & Wood
Attorneys

Feb. 2, 1926.
W. S. LUDLOW, JR
1,571,209
SIGNAL SERVICE
Filed July 24, 1922
6 Sheets-Sheet 3

Fig.3

Inventor:
Walter S. Ludlow, Jr.
By Wood & Wood
Attorneys

Feb. 2, 1926.

W. S. LUDLOW, JR 1,571,209

SIGNAL SERVICE

Filed July 24, 1922       6 Sheets-Sheet 4

Inventor:
Walter S. Ludlow, Jr.,

By Wood & Wood
Attorneys

Feb. 2, 1926.  W. S. LUDLOW, JR  1,571,209
SIGNAL SERVICE
Filed July 24, 1922      6 Sheets-Sheet 6

Inventor
Walter S. Ludlow, Jr.

By Wood & Wood
Attorneys

Patented Feb. 2, 1926.

1,571,209

UNITED STATES PATENT OFFICE.

WALTER S. LUDLOW, JR., OF DELHI, OHIO.

SIGNAL SERVICE.

Application filed July 24, 1922. Serial No. 576,946.

*To all whom it may concern:*

Be it known that I, WALTER S. LUDLOW, Jr., a citizen of the United States, and residing at Delhi, in the county of Hamilton and State of Ohio, have invented a new and useful Improvement in Signal Services, of which the following specification is a full disclosure.

This invention relates to an improved method or sytsem for the electrical transmission of signals, adapted for fire or emergency and patrol service, and to the construction and operation of alarm or call-boxes as elements necessary to the successful control and operation of such system, the call-boxes enclosing means concurring to cause transmission and registration at a central station or stations, of differentiated calls or signals of each of a plurality of such call-boxes, located at points distant from the central station.

My system is particularly adaptable for use in fire, night watch, or police signaling systems in which call-boxes are placed in factories, stores, private residences, etc., all at a distance from a central station and in electrical connection with signal receiving and recording devices at the station or firehouse, a plurality of such call-boxes being conveniently located, as in the case of a manufacturing plant, at various points throughout the building or buildings, each box capable of transmitting distinctive signals, one as a general or report signal for night watch patrol service, and another as an emergency signal or fire-call.

An object of the invention is the provision of a signaling system wherein no signal transmission takes place except upon failure of the watchman to re-set a clock-controlled signal mechanism before the end of a timed period, which period generally corresponds to a "round"; provision being made for the transmission of one signal at the beginning and one at the end of a watch period to indicate respectively on and off duty service signals.

Another object is the provision of a signal transmitting device or call-box, wherein means is provided for manually setting a time-clock mechanism for tripping a signal transmitting mechanism at the end of a timed period, said means required to be operated to re-set said time-clock mechanism before the end of such timed period to prevent signal transmission.

Another object is the provision of means manually operable by the watchman for setting a time-clock mechanism and causing signal transmission immediately thereafter to indicate that he is making his first report at the beginning of his watch period.

Another object is the provision of means for causing a compulsory re-setting of the time-clock mechanism when the watchman transmits a signal to give notice that he is beginning his watch, as when he makes his first report at the beginning of his watch period.

Another object is to provide for the transmission of a distinguishable signal at the end of a completed watch period, with only a partial re-setting of the time-clock mechanism, such signal indicating that the watchman has completed his watch or that he is leaving.

Another object of the invention is to utilize a single spring for imparting power to two separate and distinct mechanisms, in this case, a clock-signal actuating mechanism, and a time-clock mechanism for controlling said clock-signal actuating mechanism.

Another object is the provision of means for causing a record to be made upon a local time recording device at each "setting-back" operation of the time-clock mechanism, this time record being in the nature of a check upon the operating company, similar records being made at the central office or station and at the insurance bureau.

In signal systems for night watch or the like service now in use it is customary to require the watchman, policeman or attendant to "turn in" a call or signal periodically in making his patrol rounds, and his failure to give such signal is indicative of incapacity, or of lapse of duty on his part, requiring attention on the part of the service station. In systems of this class a number of subscribers are on a single service circuit line, which multiplies the number of call boxes and consequently results in the transmission of an excessive amount of signals to the service station which tends to destroy the efficiency of the service, therefore it is desirable to provide a signal system which will only transmit signals as on and off report for the attendant, incapacity after report, or emergency calls, so as to minimize the number of signals transmitted when an attendant is faithfully attending his duties.

In my system, the calls or signals are given when the watchman or attendant inattentively fails to wind or re-set a clock-controlled mechanism at the end of a predetermined period of time, whereupon a report signal will be transmitted. It is therefore only necessary, as set forth in the present invention, for the watchman to rewind the time-clock mechanism at prescribed periods or before a certain period of time has elapsed, (which period generally constitutes or corresponds to the interval between "rounds"), to prevent a signal or call from being transmitted to the central office. When such signal is transmitted it is indicative of trouble or neglect for service station attention. Since the "rounds" are required to be made with regularity, it is advantageous to have an alarm or call only when the watchman, policeman or attendant fails in duty.

The calls or alarms, other than fire alarms, are, in my method, indicative of on and off reports, non-performance, failure of duty, or of unavoidable delay, while in the other systems the calls are indicative of performance, and therefore unduly multifarious.

A casing 1 provides a closure or housing for the mechanism which is mounted upon the cover 2, detachably clamped to the casing by bolts or rods 3 stepped in the rear wall of the casing, traversing openings in said cover and projecting outwardly therethrough, nuts 4 being engaged with the rods and cover, as shown. The cover provides three pedestals 5 fastened at right angles thereto to which one member 25 of the clock frame is attached; a projection 6 forming a bearing for the fire lever shaft; and a boss 7 having a key-opening 8 therein, and providing, in addition, a journal or bearing for a shaft operable by the policeman's, watchman's or attendant's lever 9, for setting the mechanism of the timing device through the agency of certain levers. The mechanism attached in the above manner may be inspected for purposes of repair and adjustment by removing the cover.

The clock frame supports two clock trains, one as a clock-signalling train for operating the striking or alarm mechanism and the other a time-clock train for timing the interval between signals, both trains being propelled by a single spring attached at one end to the winding shaft 15, rotatively journaled in the clock frame and axially aligned with the key opening 8, the opposite end of the spring being connected in a manner hereinafter more fully described. One end of the shaft 15 is squared as at 16 for cooperation with a suitable clock winding key insertable through the opening 8 for an initial hand winding. Since all shafts of the mechanism are parallel and lie in a horizontal position, no further mention of their disposition will be made.

The main time clock-gear 18 (see Figs. 12, 13 and 14) is rotatively mounted upon a counterturned portion 19 of the hub of a lever 22, for convenience designated the clock lever, which in turn is rotatively mounted upon the shaft 15 adjacent the inner side of the attaching frame member 25, of the clock-frame, and against a shoulder of the shaft, said shaft being supported in suitable bearings of the member 25 and in similar bearings of the opposite frame member 27, superposed upon and lying beyond an intermediate frame 26 between which frame and frame 25 the shafts of the gear trains are disposed. A ratchet wheel 28 is keyed to the counterturned portion 19 of the clock-lever hub and provides an annular spring housing 29 integral and concentric therewith, to which is attached, as at 30, one end of a clock spring 31, the opposite end of the said spring being attached as at 32ª to a hub 32 of a second ratchet wheel 33, forming a closure for the spring housing 29, the hub 32 being keyed to the main shaft 15. Against the outer face of the ratchet wheel 33 is placed the main gear 35 of the signalling train, said gear being rotatively mounted on the shaft 15 and held frictionally and yieldingly against the ratchet wheel by suitable means, indicated at 36. The gear 35 carries a spring-pressed pawl 34, (see Figure 14), engageable with the teeth 37 of the ratchet, the space between these teeth corresponding to that degree of shaft turning and spring winding necessary to cause, upon release of the signal lever, a single rotation of the call disks 99, 104, mounted upon a separate shaft and in train with the gear 35. The main clock gear 18 carries a spring-pressed pawl 20 engageable with the teeth 21 of the said ratchet wheel 28, the pawl being designed to transmit power to the time-clock train by action of the spring 31. The spring 31 is wound when the clock-lever 22 is rotated in an anti-clockwise direction, and when the shaft 15 is rotated in clockwise direction.

The extremity of the shaft 15 (see Figs. 1, 5, 12 and 15) adjacent the outside of the frame member 27 has a disk cam 133 rigidly attached thereto, a portion of its periphery 136 being designed to engage a contact piece 137 of insulating material attached at the end of one spring arm 138 of a two arm switch, to open the switch and hold the same open while a fire-call is being transmitted. The disk further provides a pin 135 designed to release a disk translating lever 125 capable of being automatically disposed to hold the disks in translated position, while rotating to send a fire-alarm, all hereinafter more fully described in detail.

The opposite end of the shaft 15 (see Fig. 5) outside of, adjacent the frame member 25, and between said member and the cover 2 is provided with a lever 40, for convenience designated the signal lever, keyed to the main shaft 15, and having a notch 41 in its outer extremity engageable by pin 42 of a flexibly sustained arm 43, pivoted at 44, to one arm 45 of a two-armed lever 46 of laminated construction, said lever rigidly attached to a shaft 48, journaled in the boss 7 of the cover, said shaft extending therethrough outside thereof and provided with a cylindrical hub 50, (see Fig. 3) having oppositely disposed parallel slots 51 therein engageable by the forks 10 of a watchman's clock setting and clock winding lever 9.

Figure 1:
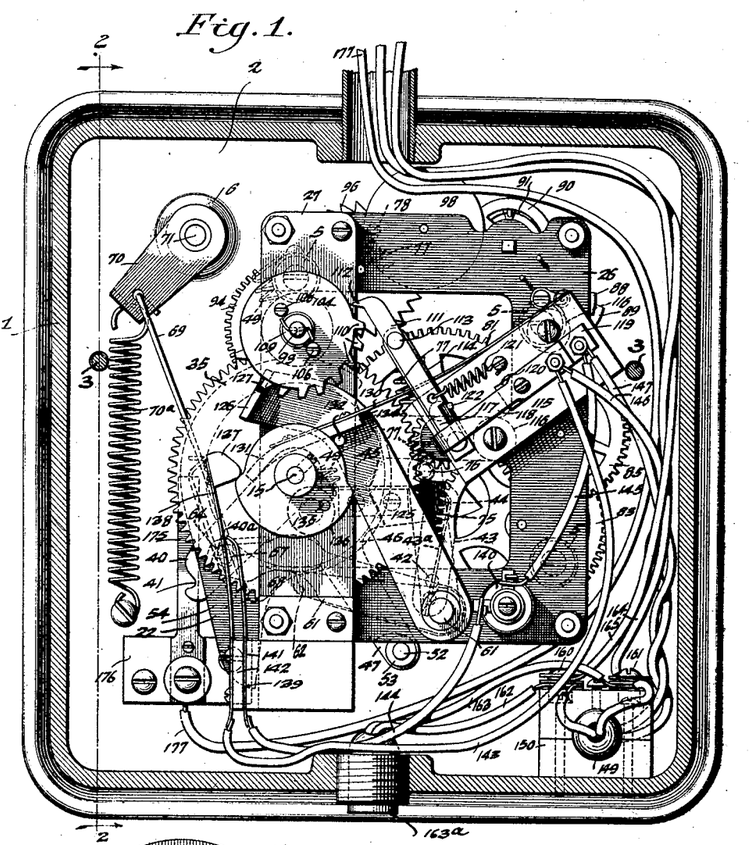
Figure 1 is a vertical section on line 1—1, of Figure 2, looking from the rear towards the front the mechanism being shown in elevation and conditioned as when delivered for installation.
Figure 2:
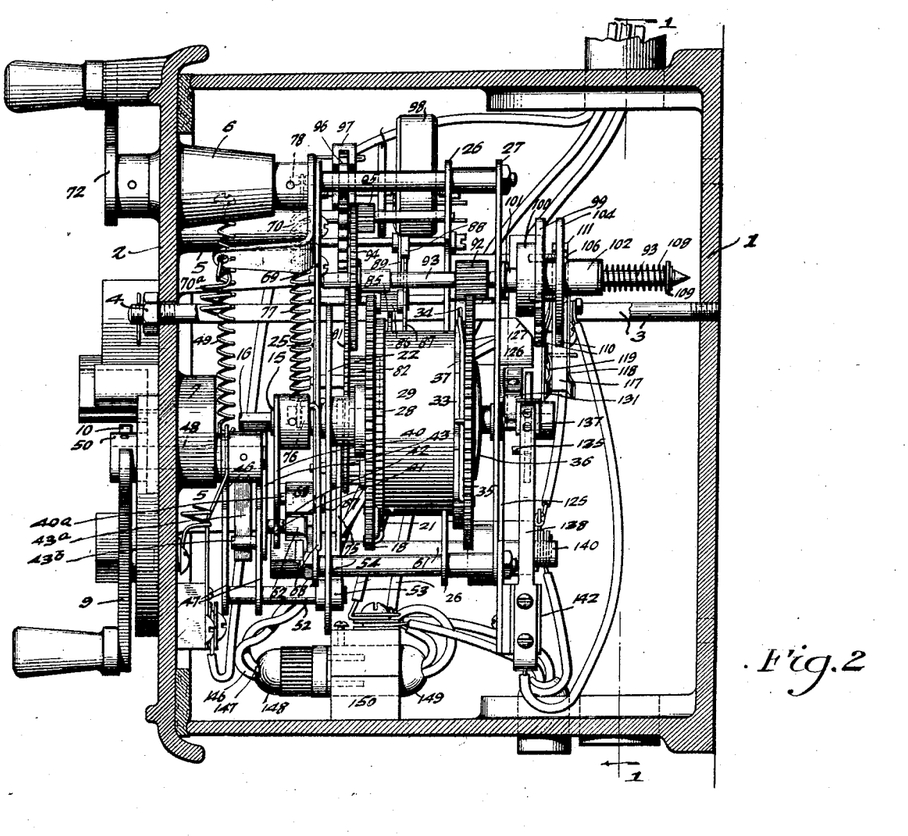
Figure 2 is a vertical section on line 2—2, Figure 1.
Figures 6, 7, 8, 10, 11:
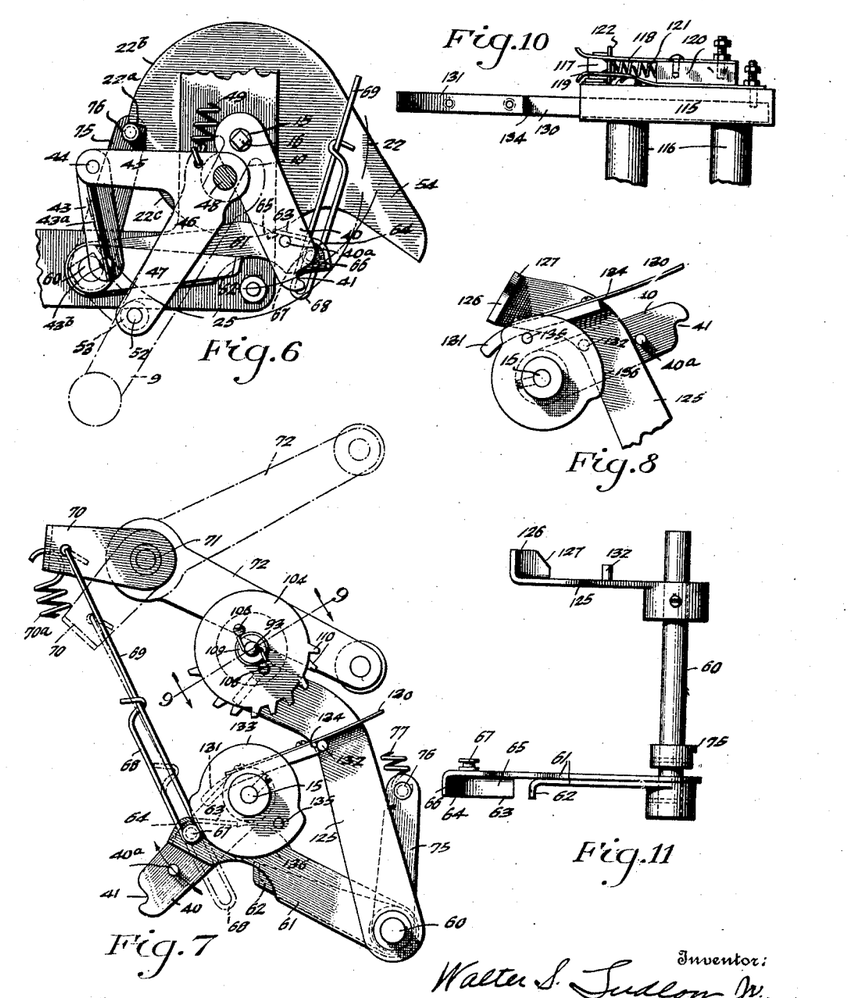
Figure 6 is a view of the mechanism shown in Figure 4, illustrating the position of the elements thereof when the latch lever is being operated by the pin of the signal lever to release the clock lever now locked against counter-clockwise rotation as a result of the failure of the watchman to "set back".
Figure 7 is a diagrammatic view showing the position of the elements after pulling of the fire lever, illustrating the locked position of the disk translating lever, and the release of the signal lever.
Figure 8 is a detail view illustrating the position of the disk translating lever immediately after release from its disk sustaining position.
Figure 10 is a bottom plan view illustrating the call switch structure and mounting.
Figure 11 is a detached bottom plan view of the latch lever, catch lever and disk translating lever as relatively mounted upon their common shaft.

The shaft 48 carrying the lever 46 is rotatable in a counter-clockwise direction against action of a spring 49 attached at one end to the arm 45 and at the other end to one of the pedestals 6, this spring acting to normally hold the lever positioned, as shown in Figures 1 and 6. The other arm 47 of the lever 46 provides an outstanding arm 52 having at its extremity a roller 53 engageable with the arm 54 of the clock lever 22, for rotating said lever and ratchet wheel 28 attached to the hub thereof, in a counter-clockwise direction to wind the clock spring and set the timing mechanism, during which setting operation the pin 42 by riding over the rounded end of the signal lever 40 is disposed in the path of the notch 41, and thus positioned to engage said notch and subsequently rotate the signal lever (when disposed, as shown in Figures 1, 2 and 5) in a clockwise direction to correspondingly rotate the ratchet wheel 35 and wind the spring, when the watchman's lever 9 is forcibly returned to its initial position for removal, thus setting the mechanism for immediately thereafter operating, to give one watchman's "on duty" call indicating that he is starting his "watch".

The arm 43 is yieldably sustained in an outstanding position by spring 43ª loosely engaged at its outer end with the slot of a pin 43ᵇ, the spring extending parallel with the arm and being bent about the pivot 44 and attached at its opposite end to the arm 45 between the laminations of the lever 46.

The main shaft 15 and the shaft 48 are relatively eccentrically pivotally disposed for a purpose herebelow described. (See Figures 1, 2, 3, 4, 5 and 6.)

Figure 3:
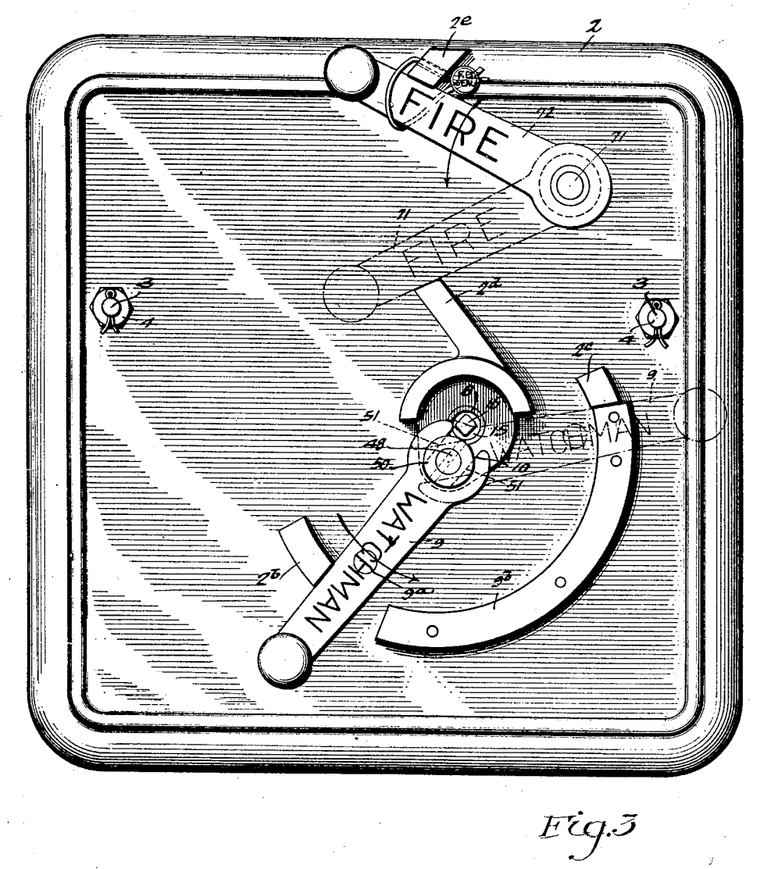
Figure 3 is an exterior face view of the cover showing the initial position of the watchman's or attendant's lever, and fire lever, and in dot-and-dash lines the respective positions of the levers after having been pulled.
Figures 4, 5, 9:
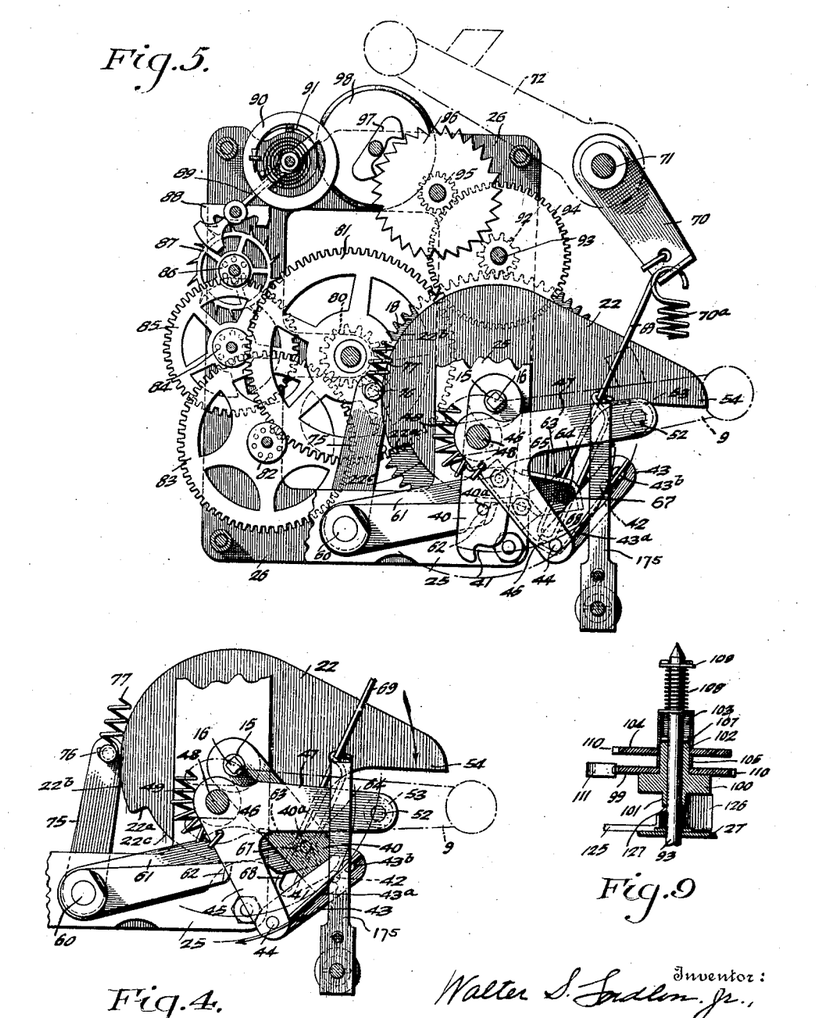
Figure 4 shows the position of the elements of the clock-setting and winding mechanism immediately after the same have been set, the setting lever being in the act of winding the call mechanism for giving immediately thereafter an "on duty" call or signal.
Figure 5 is a view illustrating the mechanism of Figure 4 looking from the front towards the rear, positioned as when the watchman has just "set back", a portion of the clock frame being broken away to show the clock train.
Figure 9 is a sectional view through the break wheels or disks illustrating their mounting upon the shaft.

The illustration of Figure 3 shows the position of the watchman's lever 9 as initially engaged by means of slot 10 in its end, with the grooves 51 of the hub 50, preparatory to the rotation of the shaft 48, in a counter-clockwise direction to position the arm 54 of the clock-lever 22, as shown in Figure 5. This setting or re-setting is accomplished by the engagement of the roller 53, with the arm 54 of said lever 22, and the spring 31 is wound and the time-clock mechanism set simultaneously therewith. After this operation has been performed by moving the watchman's lever 9 to a position shown in dot-and-dash lines in Figure 3, the direction of the lever movement is reversed to bring the same to its initial position, and allow its removal from the grooves 51, of the hub 50. During this reverse or clockwise movement of the lever, represented as now taking place in Figure 5, the roller 53, is traveling away from the arm 54, leaving the same positioned for a subsequent timed rotation in a clockwise direction. The pin 42, having previously yieldably ridden over the rounded end of the lever 40 during the initial counter-clockwise movement of the watchman's lever, and lever 46, engages, (on the return or clockwise movement of said lever) with the notch 41 and rotates the lever 40 in a clockwise direction through an arc corresponding to the distance between two notches of the ratchet wheel 35, which degree of rotation and setting in turn corresponds to two rotations of the call disk shaft 93. After the setting above described, the watchman's lever is removed, the signal lever 40 being thereby immediately released, and the mechanism operates to give one rotation of the call disk 104 and thus one signal at the central station, showing that the watchman has begun his "beat". When the watchman's lever has reached its initial position after having been forcibly moved in the clockwise direction, above described, the pin 42 is spring-released from the notch 41 of the lever 40, the release being accomplished as a result of the spring having been flexed inwardly from its initial outstanding position, by the rotation of the relatively eccentrically pivoted levers 46 and 40, and the said lever 40 impelled by the clock spring 31, moves in a counter-clockwise direction until the pin 40$^a$ engages the stop 62, of the latch lever 61, in which position the mechanism is held, one signal having been made at the central station.

A removal of the lever 9 from engagement with the hub 50 when said lever is positioned as shown in dot-and-dash lines in Figure 3, is prevented, in order to compel the watchman to return the lever to its initial position to give the "on duty" signal. If the lever could be removed when in its upper position such "on duty" signal would not be transmitted. In order to prevent the removal of the lever, the same is provided with an inwardly projecting pin 9$^a$ which, when an attempt is made to remove the lever as above mentioned, engages the inner face of the arcuate lug 9$^b$ attached to the outer face of the cover 2, as shown. A space sufficient for the ready insertion of the lever is provided between a stop 2$^b$ of the cover and the lower end of the lug 9$^b$, and an additional stop 2$^c$ is provided at the opposite end of the lug for limiting lever movement in that direction. Lower and upper stops, respectively 2$^d$ and 2$^e$, are provided for the fire lever, and a suitable seal is also provided, the wire of which traverses the opening of the stop 2$^e$, and encircles the lever, this seal being broken when it is desired to operate the fire lever.

The mechanism is thus set in such a manner that should the watchman at the end of a predetermined period of time fail to insert his lever and rotate the shaft 48 to return the arm 54 to its position in Figure 5 and re-set the clock mechanism, a signal will be transmitted at the central office by one rotation of the call disk, due to the release of the pin 40$^a$ from the stop 62 in a manner more particularly hereinafter described, which release allows the lever 40 to travel in a counter-clockwise direction, and the pin 40$^a$ to engage with the stop 64 of the plate 63, this position being shown in Figure 6. Thus it is only necessary for the watchman to pull his lever in a counter-clockwise direction before a predetermined length of time has elapsed and so rewinding the clock train, to prevent the second call from being registered at the home office to indicate that he has failed in duty. The lever 22 may be given any degree of rotation, conformably to the period of time desired between reports, calls or signals, and this is accomplished by providing extensions of suitable length attached to the lever and engageable with a stop on the cover 2 to limit the degree of lever rotation.

Adjacent the bottom side of the clock frame is disposed a rock-shaft 60, stepped in and extending between the frames 25, 27, and projecting therebeyond. This shaft carries three levers rigidly attached thereto, the relations and functions of which are fully described herebelow.

At the outside of the frame member 25 and slidably disposed thereagainst is rigidly attached to the shaft 60, a lever 61, for convenience designated the latch lever. (see Figures 4, 5, 6, 7 and 11) providing intermediate its length an outstanding stop 62, presenting an inclined surface and a terminal stop 64 formed by an outstanding plate 63 bent to provide the shoulder or stop 64 intermediate of two inclined surfaces 65, 66, either stop 62 or 64 being engageable by the pin 40$^a$, both being disposable in the path of rotation of said pin. The latch lever 61 is further provided at its extremity with an outstanding headed pin 67 (see Figs. 4 and 16) about which is slidably engaged an elongated loop 68 at the end of a wire 69, the opposite end of said wire being connected to an arm 70 attached to a shaft 71 rotatably disposed in the boss 6, the opposite end of the said shaft outside of the cover having attached thereto the fire lever 72. A spring 70ª attached to an inturned end of said arm 70, and to the cover, normally holds the fire lever in the position shown in full lines in Figures 1, 2, 3, and 4.

As shown in Figure 5, when the pin 40ª is engaged with the stop 62, the pin 42 is not in the path of the notch 41 and therefore when the watchman rotates the shaft 48 in reverse directions, to "set back", no engagement of the pin 42 with said notch will take place to cause a winding movement of the lever 40. Therefore, if the watchman sets back the arm 54 before a predetermined period of time has elapsed, the pin 40ª will remain engaged with the stop 62 and no "failure of duty" signal will be registered.

On the shaft 60, inside of the frame 25 and adjacent the lever 22, is rigidly attached trip arm 75 provided with an out-standing pin 76 designed to engage the periphery of the lever 22, and, under certain conditions, to engage a radially disposed shoulder 22ª formed at the junction between the concentric peripheries of different radii 22ᵇ—22ᶜ. To the pin 76 is attached one end of a spring 77, the opposite end of which is attached to the frame as at 78, said spring functioning to bring the pin 76, into engagement with the peripheries 22ᵇ—22ᶜ of the lever 22.

After the clock lever 22 is set, as above described, by the watchman, as he reports for duty, and after an "on duty" report signal has been given, the pin 40ª remains engaged with the stop 62, (see Fig. 5). The clock mechanism now operates to cause a timed movement of the arm 54 in clockwise direction, the pin 76, of the arm 75, being engaged with the periphery 22ᵇ of the lever 22, above the shoulder 22ª, thus preventing the depression of the latch lever and consequent release of the signal lever 40, which release would cause another rotation of the call disk, and transmit a signal indicative of failure of duty. If, however, the watchman fails to set back the arm 54 at the end of a predetermined time, the rotation of the lever 22 will cause the shoulder to rise, (see Fig. 6), allowing the pin to engage therebelow, allowing the latch lever to rotate to move the stop 62 downwardly and release the pin 40ª, after which the arm 40 will travel in counter-clockwise direction until the pin, engaging the inclined surface 63 of the stop 64, slightly raises the latch lever to release the pin 76 from the shoulder 22ª and so dispose the same as to allow a resetting of the lever 22, the pin 40ª lodging against the stop 64, thus preventing further rotation of the arm 40.

The main time-clock gear 18 is connected through the pinion 80 with the clock gear train, the gears only of which are referred to herein in order to simplify the description, said gears being carried by the usual shafts stepped in the clock frame. The train connected by the pinion 80 with the gear 18 comprises a gear 81, pinion 82, gear 83, pinion 84, gear 85, pinion 86 upon the escapement shaft, escapement wheel 87, detent 88, balance lever 89, balance wheel 90, balance spring 91. The operation of the clock mechanism is well known and no further description of the same will be given herein.

The gear 35 meshes with the pinion 92, mounted upon the break wheel shaft 93, which shaft extends between and beyond the frames 25, 27. The break wheel or call disk shaft 93 is in train through its gear 94, with pinion 95, escapement wheel 96, detent 97, and balance wheel 98. Upon the extension of the shaft 93 are slidingly mounted, as a unit, two call disks or signal transmitting break wheels, Fig. 9, one as a fire-call disk 99, and a second as a watchman's call disk 104. The call disks 99 and 104 are fixed upon a hub extension 102, extending from one side of a hub 100. They are spaced apart by a collar 105 and secured together as a unit by screws 106. The hub 100 at its opposite side is provided with a reduced hub extension 101 which normally engages or bears against the clock frame or plate 27. (See Fig. 2.) The outer end of the hub extension 102 is slotted longitudinally as at 103 for slidably keying or pinning the hub to the shaft 93.

A pin 107 traverses the shaft 93 and engages the slot 103 non-rotatively connecting the disks with the shaft but permitting the disks to be shifted laterally against the action of a coil spring 108 surrounding the outer end of the shaft and interposed between a washer loosely disposed upon the shaft and contacting the outer face, the hub, and a washer or collar 109 held upon the shaft by a cross-pin. Each disk is provided on its periphery with teeth 110, the number and spacing of same being appropriate for differential signalling, and for this reason each signal or break wheel is cut for transmitting a distinctive signal. The teeth of each break wheel, when either wheel is in its signal transmitting position, successively engage an electrical circuit making and breaking lever 111, as a switch lever, (see Figs. 1 and 15) by making contact with the inturned end 112 of one arm of the lever 111. The lever is pivoted at 113 to a leaf spring 114, mounted upon and projecting from an insulating block 115, the said block being suitably attached as by screws to pedestals 116, projecting from the frame 26. The outer end 117, of the opposite arm of the lever engages between the flexible switch fingers 118, 119, and normally closes a circuit therebetween, said fingers being suitably insulated from one another by block 120, the finger 118 being mounted upon the outer side of the block and the finger 119 between the blocks 120 and 115.

The switch being designed for closed circuit service, under normal conditions is engaged between and in contact with the switch fingers and is tripped by the break wheels for making and breaking the circuit for a signal transmission. A spring 121 is attached to the arm 117 to force the outer end of this arm between the terminals of the fingers and against a stop pin 122, the sharp impacts of lever arm with this pin producing audible sounds or clicks for locally determining whether the signal transmission is being made.

Upon the outer ends of the shaft 60, outside of the frame 26 and slidingly disposed against the frame 27, is mounted a lever 125 (see Figs. 7 and 11), for convenience designated the translating lever. The outer end of the lever lies adjacent and beneath the shaft 93 and between the hub 100 and the frame member 27, and the extremity of the lever provides an outstanding portion 126, providing an inclined edge 127, designed to engage the hub 100 for sliding both disks outwardly away from the frame 27, to align the fire disk 99 with the switch arm 111, (see Fig. 9), this operation being accomplished when the shaft 60 is rotated by pulling the fire lever 72, through the agency of the loop 68 connected to the latch arm 61.

The translating lever 125, when positioned to dispose the fire-call disk as above described, is held so positioned, (see Fig. 7), by a latch mechanism, comprising a spring arm 130 attached to the insulating block 115, and having attached to its outer end a curved finger 131, the lower surface of which normally rests, (see Fig. 1), upon a pin 132, projecting from the lever 125. The finger is slidingly disposed between and against the disk cam 133 and frame 27, and when the fire lever is pulled, the pin 132 of the lever 125 engages and is locked by a shoulder 134, formed at the end of the finger. The finger is thus depressed to dispose its lower surface in the path of a pin 135, carried by the disk cam 133, which pin, after the proper number of rotations of the call disk have taken place, (the cam rotating at a relatively low rate of speed), engages the finger 131 and raises the same sufficiently to release the pin from the shoulder 134, which allows the spring 77 to return the lever 125 to its normal position, releasing the break wheels or call disks which are returned to their initial position, in which position the outer disk 104 again engages the signal lever 111 to give, in addition to the fire-call, a second signal indicating the exact location of the call-box at which the alarm was turned in. The disk cam 133 is so positioned that a portion 136 of its periphery engages the insulated terminal 137 of the spring arm 138 of the spring switch 139, immediately before the fire disk begins to rotate, to break electrical connection at the switch, cutting out the resistance 140, (the function of which is hereinafter more fully described), and causing the fire call to override all other signals. The return of the lever 125 to normal position also disposes the stop 62 for engagement by the pin 40ª as the said lever travels in clockwise direction. The arms 138, of the switch 139 are insulated by a block 142, attached to the frame 27. The terminal of the arm 138 is connected by a wire 143 with the terminal of the spring arm 118, and the terminal of the arm 141, by wire 144, with one terminal of the resistance coil 140, the opposite terminal of said coil being connected by wire 145 with the terminal 119. Conductors 146, 147, are attached at the terminals of the spring arms 118, 119, and these conductors are attached to a plug 148, and said plug coacts with a companion plug member 149, mounted in a block of insulation 150, attached to the casing 1, and the terminals of the said companion plug member connect with binding screws 160, 161, in turn connected by wires 162, 163, with a test plug member 163ª, mounted in the casing. Main line wires 164, 165, are also connected to the binding screws and lead into a suitable conduit, (not shown), designed to have engagement with a threaded opening of the casing 1.

A local time register, is electrically operated each time the watchman throws his lever, to reset or to give the initial "on duty" signal. The registering device is operated through the agency of a spring finger 175, mounted on an insulating block 176, attached to the cover, said finger being engaged by the arm 47 when the watchman's lever is pulled. One conducting wire 177 is employed to connect the terminal of the finger with the time-registering device 180 (see Fig. 15), the opposite terminal of the registering device being grounded in a suitable manner. Whenever the attendant "sets back" by pulling his lever, from its initial position, to its limit of movement in an anti-clockwise direction, a time record is made.

As before stated, the pulling of the fire lever disposes the mechanism to give a fire signal, whatever the position of the arms 40—54, whether the arm 40 is in the act of moving or has its pin 40ª engaged with either of the latch arm stops.

Figures 7 and 9 illustrate the position of the mechanism after the fire lever has been pulled. The setting of the levers 61, 75, 125, is shown in Fig. 7, wherein the fire lever 72 is shown in depressed condition, this depression causing the lower end of the loop to engage with the pin 67 of the latch lever 61, raising the same, rotating the shaft 60 and putting the spring 77, attached to the upper end of the arm 75 under tension, causing the outer end of the translating lever 125 to engage the hub 100 to throw the disks outwardly to position shown in Fig. 9.

Simultaneously with the above movement, the pin 40ª is released from this stop of the latch lever with which it may have been engaged, and thus the call mechanism is allowed to operate to cause the registration of a fire alarm.

Figures 12, 13, 14, 15:
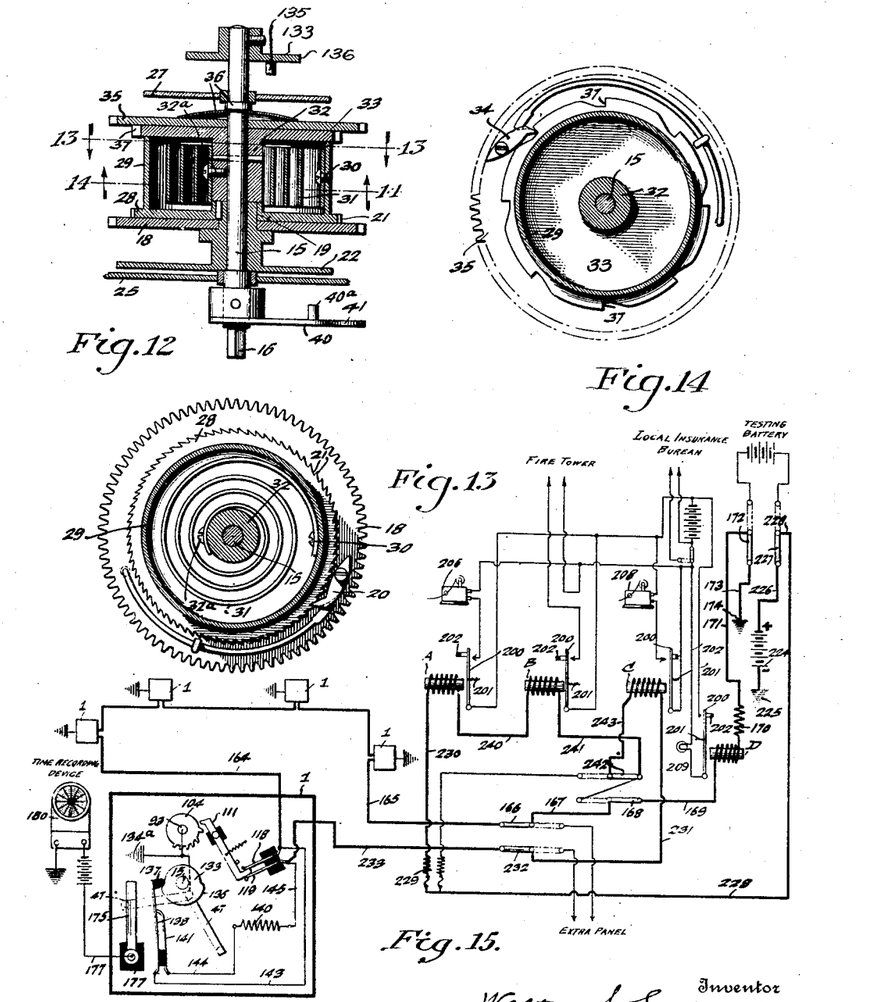
Figure 12 is a detail section illustrating the structure for single spring propulsion of the two gear trains.
Figure 13 is a sectional view on line 13—13, Figure 12.
Figure 14 is a similar view on line 14—14, Figure 12.
Figure 15 is a diagrammatic view of a signal system containing my improvements in their simplest form.

As a preliminary to a detailed description of the system and its operation, as represented diagrammatically in Fig. 15, a brief recapitulation of the operations of the recording, timing and alarm mechanism and of the effects of such operations upon the electrically controlled recording devices, is now given.

When the attendant reports for duty he inserts his lever, (see Fig. 3), pushes the same in an anti-clockwise direction and causes a record of the time at which the report is made to be registered on the local time-recording device 180, at the same time winding the clock-spring and setting the time-clock mechanism by rotating the arm 54. He immediately pushes his lever in the opposite or clockwise direction, engages the signal lever and winds the clock spring, then releases the lever to register an "on duty" signal, at the central station. After giving this "on duty" signal, the watchman's lever is removed and a timed rotation of the lever 22 takes place in a clockwise direction. The watchman's lever must be pulled in an anti-clockwise direction to re-set the lever 22 before a predetermined period of time has elapsed to prevent the registration of "failure of duty" signal at the central station. In case of fire, the fire lever is pulled to raise the stops 62, 64, release the signal lever and translate the fire disk to a position for engagement by the lever 111 registering a double call or alarm at the central station and fire-tower.

The signal sending mechanism of each call box and the signal control devices or relays are connected in series in a closed electrical circuit, (see Fig. 15).

The armatures of the signal-control devices or relays are operated to alternately make and break the local signal circuits, through two circuits; a ground return circuit, and a main line circuit, the main line circuit being broken only when a fire signal is to be transmitted.

The signal-control devices are selectively operated as a result of current strength differences and armature adjustment, each having its armature adjusted for differential actuation conformably to the character of the signal desired.

Letters A, B, C and D designate the respective signal-control devices or relays, each designed to control its respective local recording device and each having an armature 200, a spring diagrammatically represented at 201 for adjusting the pull of the armature, and an insulated armature stop 202. Each armature is designed to close and open its respective local circuit, each operating a signal transmitting device at the central office or station. These signal transmitting devices may be of any desired type, and, for convenience, in this disclosure all are shown as being electrically connected in a single open circuit, the current being furnished by a single battery. It is obvious that other wiring arrangements may be used.

The main line circuit is shown in heavy lines, and, as herein disclosed, comprises the following elements:

Battery 224, grounded at 225, conductor 226, switch arm 227, conductor 228, resistance 229, conductor 230, connected with one terminal of the magnet coil of relay A, the opposite terminal of the coil being connected by conductor 240 to terminal of the magnet coil of relay B. Opposite terminal of magnet coil of relay B connected by conductor 241 with one terminal of switch lever 242, opposite terminal of the switch lever 242 connected by conductor 243 with one terminal of the magnet coil of relay C, the opposite terminal of this coil being connected by conductor 231 through switch lever 232, and conductor 233, with spring finger 119. The circuit between the spring fingers 119, 118, is normally closed by the end of the lever 111, the resistance 140 being thus cut out of the main line.

The armature of the relay A, for convenience herein designated "the night-watch relay," is designed to operate or be released, to close a local circuit to a signal device located at the central station, when the main line current is decreased, and its armature spring is suitably adjusted for that purpose.

The armature of the relay B, designated "the fire relay" is designed to operate to close a local circuit to a signal device to give an alarm signal at the fire-tower, when the main line circuit is broken, the relay A at that time also operating, so that in case of fire, both relays A and B register signals, one of which signals may show the location of the building and the other the exact location of the box from which the call is given.

The armature of the relay C, designated "the ground night-watch relay" operates on increased current and therefore in a phase opposite to that of the relays A and B, its armature being attracted to give a signal while the armatures of magnets A and B are released for that purpose.

The relay D is designed to operate on decreased current to flash a light or other means as an auxiliary signal, and, therefore, operates whenever either or both relays A and B operate or when C operates and is used to indicate any trouble on line.

Conductor 164 leads from finger 118 and additional call boxes 1 are connected in series, conductor 165 leading from the last call box of the series and being connected to one terminal of switch lever 166, the opposite terminal of said lever being connected by wire 167 through switch 168, by the conductor 169, with one terminal of the magnet coil of relay D. The opposite terminal of this coil is connected through resistance 170, conductor 171, switch 172, conductor 173, to ground 174.

The operation is as follows:

When the break wheel 104 rotates, as a result of the manipulation of the watchman's lever, the first tooth of the wheel engages the upper end of the lever 111, causing the ground circuit to be completed in the following manner:—

From positive side of battery 224, conductor 226, switch arm 227, conductor 228, resistance 229, conductor 230, magnet coils of relays A, B, C, conductor 231, switch arm 232, conductor 233, spring arm 119 to lever 111, disk 104, to ground 134ª, thence to negative side of battery 224 by ground 225.

The magnet of the relay C, as a result of the increased current caused by cutting out of resistance 170, is efficiently energized and its armature attracted, making the circuit to the recording device 208 which registers.

On continued rotation of the disk 104, the lower end of the lever is withdrawn from between the spring fingers 118, 119. This action does not break the main line circuit but throws resistance 140 into the main line, as a result of which the magnet of relay A is weakened and its armature released to cause the local circuit to be closed to operate the recording device 206.

When the lever 111 is released and its upper extremity falls between the teeth and out of contact with the disk, its lower end is again engaged between the fingers 118, 119, the resistance 140 is cut out and the increased current on the main line causes an attraction of the armature of relay A, breaking the local circuit.

The relay D also operates when the relay A operates, and, therefore, a signal by the light 209 is given simultaneously with the operation of recording device 206. The circuits are broken and made, in the manner above described, at each contact and release of the lever with a tooth of the break wheel, causing a corresponding number of signals to be made by the registering device.

When the fire lever is operated, the resistance 140 is cut out of the main line, as a result of the rotation of the disk cam 133, which separates the switch elements 138—141. The ground circuit is made in the manner hereinbefore described. When, under this condition, however, the lower end of the lever 111 is withdrawn from between the fingers 118—119, the main line circuit is broken and the armature of the fire relay B is released, as well as the armature relays A and D.

Figure 16:
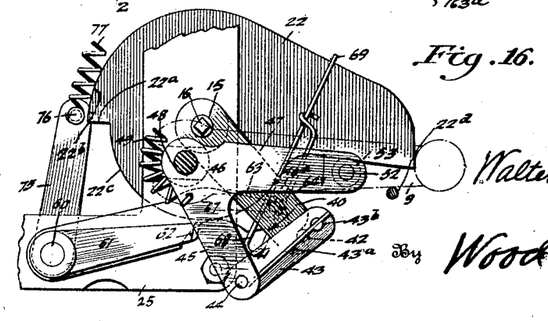
Figure 16 is a view similar to Figure 4, illustrating a modified form of my invention providing for the sending of an "off duty" signal without compulsory resetting of the timing mechanism.

Figure 16 illustrates a modification in which a distinguishable "off-duty" signal may be transmitted immediately after the transmission of the usual signal at the end of a watch period.

In this instance, the watchman instead of rewinding the time clock before the end of his period to prevent signal transmission allows the same to run down to cause such transmission which would ordinarily indicate a failure of duty, but which, in this case, is immediately followed by a second distinguishable "off-duty" signal, indicating that he is leaving.

In order to permit of the actuation of the signal lever without unduly rewinding or resetting the clock lever, a stop 22ᵈ (see Fig. 16) is provided to limit the clockwise rotation of the arm 54 of the clock lever 22, to such a degree that the lever 46 may be rotated to cause engagement of the pin 42 with the notch 41 to rotate the signal lever 40 and release the same, allowing counter-clockwise rotation through its full rotative arc and causing a transmission of said distinguishable "off-duty" signal.

The notch 22ª of the clock lever, when the said lever is engaged with the stop 22ᵈ, is disposed to allow the pin 76 to move inwardly, and the latch lever downwardly, whereby the pin 40ª will pass the stop 62 and lodge against the stop 64.

From the foregoing description it will be observed that a single clock spring is employed for operating the time-clock mechanism and the clock signal transmitting mechanism, although each functions independently of the other and a rewind of the spring is accomplished through either or both clock mechanisms, and it is, therefore, within the concept to employ a power spring for both. Likewise separate patrol signal service clock mechanism and an emergency or fire signal service clock mechanism may be employed for transmitting through different break wheels to the elimination of the shifting of the two break wheels alternately into cooperation with the break finger, although the preferred arrangement herein shown provides test features for the signal circuit through the patrol service signals for "on" and "off" duty calls, which must be given within prescribed times, and when transmitted at such times is indicative that the device is in working condition, and as the major parts of the signal mechanism for the patrol service are in service for fire or emergency signals, the frequent special testing of the device is eliminated.

The employment of a single spring for the several independent clock trains has its advantages for check or test purposes, for in the event of the spring breaking, the "on" and "off" duty calls would not be received and investigation by the central station would follow. Thus the daily operation of the patrol service signals is a daily test and notification to the central office that the system is in operative condition for the various uses. Transmitting the "on" and "off" duty calls indicates that the clock mechanism is in operative condition and also the contacts controlling the electric circuit. The contacts being in frequent use prevents corrosion and the device is always in a workable condition for an emergency call.

The time clock is the primary factor and it must be periodically re-set within a definite lapse of time otherwise a service signal will be transmitted to the central office for which the attendant is held accountable. The time clock, unless re-set within a prescribed period, will automatically trip the signal transmitting mechanism. A partial re-wind or re-set is compulsory before the attendant can trip the signal mechanism for an "on" duty call, and his neglect to fully set the time clock would necessitate an early re-setting to avoid a signal transmission. The same applies for an "off" duty call, which first necessitates that a timing period lapse automatically, sending in a service signal before he can send in his "off" duty signal, requiring the attendant to stay on duty full time, and to transmit an "off" duty signal, the timing mechanism must be slightly rewound, whereupon a second service signal follows the manually controlled signal. These latter signals follow one another in short order. The emergency signal dominates all for when operated, shifts the signal wheels and releases the signal clock mechanism.

Having described my invention, I claim:

1. An electrical signal transmitting device comprising a clockwork signal-actuating mechanism, and a time-clock mechanism for controlling said clock signal-actuating mechanism, a common power-imparting spring for said mechanisms, and means movable in opposite directions for winding said spring in one direction of rotation, and setting said time-clock mechanism for actuation at the end of a period of time, and in a reverse direction for releasing said clock signal-actuating mechanism.

2. An electrical signal transmitting device comprising a clockwork signal-actuating mechanism, and a time-clock mechanism for controlling said clock signal-actuating mechanism, a common power-imparting spring for said mechanisms, and means movable in opposite directions for winding said spring in one direction of rotation, for setting said time-clock mechanism for actuation at the end of a period of time, and in a reverse direction for further winding of said spring and for releasing said clock signal-actuating mechanism, and stop means for automatically arresting the movement of said clock signal-actuating mechanism after a signal has been transmitted thereby.

3. A signal system comprising a signal circuit, a signal controlling device and switch in said circuit, switch-actuating mechanism for opening and closing said switch, a clock gearing for time control of said switch-actuating mechanism, a spring for said clock, a lever connecting with said clock gearing for winding said spring, means for rotating said lever for winding said spring for a time setting of said clock to subsequently cause a timed reverse travel of said lever, and means for intercepting lever travel, to prevent operation of said switch-actuating mechanism.

4. An electrical signal transmitting device, comprising a clockwork signal-actuating mechanism, and a time-clock mechanism for controlling said clock signal-actuating mechanism, a common power-imparting spring for said mechanisms, levers respectively for said clockwork signal-actuating mechanism and time-clock mechanism, each relatively concentrically pivoted, and each lever operable in relatively opposite directions to wind said spring, a two-armed lever eccentrically pivoted with respect to said first named levers, one arm thereof engageable with one of said levers to wind said spring and time-set said lever, and the second arm resiliently engageable with the second lever to wind said spring in an opposite stroke and to release said second lever at the end of such stroke, stop means for arresting movement of said second lever, after release, said stop means releasable by said first mentioned lever at the end of a timed period, and additional stop means for arresting the movement of said second lever after a second release, and manually operable means for releasing said stop means, independently of a timed release.

5. An electrical signal transmitting device, comprising a clockwork signal-actuating mechanism, and a time-clock mechanism for controlling said clock signal-actuating mechanism, a common power-imparting spring for said mechanisms, levers respectively for said clockwork signal-actuating mechanism and time-clock mechanism, each lever operable in relatively opposite directions to wind said spring, a two-armed lever eccentrically pivoted with respect to said first named lever, one arm thereof engageable with one of said levers to wind the spring, and the second arm resiliently disposed, engageable with the second lever to wind said spring in an opposite stroke and to automatically release said second lever at the end of such stroke, means for arresting movement of said second lever, said means releasable by said first mentioned lever at the end of a timed period, and additional stop means for arresting the movement of said second lever after a second release.

6. An electrical signal transmitting device, comprising a signal-actuating mechanism, and a time-clock mechanism for controlling said signal-actuating mechanism, a common power-imparting spring for said mechanisms, a clock winding lever for said time-clock mechanism and a lever for winding said spring and controlling said signal-actuating mechanism, said levers concentrically pivoted, a two-armed lever eccentrically pivoted with respect to said first mentioned levers, means upon one of the arms of said two-armed lever for engagement with said clock lever for winding said spring to set said clock mechanism, a spring finger upon the opposite arm of said two-armed lever engageable with said signal lever when the same is in a predetermined position, a pin upon said signal lever, a latch lever having respective intermediate and terminal stops thereon engageable by said pin to arrest the movement of said signal lever, means carried by said clock winding lever for a timed release of said stop to allow actuation of the clock signal-actuating mechanism, and means manually operable to release said stops independently of a timed release.

7. An electrical signal transmitting device, comprising a clockwork signal-actuating mechanism, and a time-clock mechanism for controlling said clock signal-actuating mechanism, a common power-imparting spring for said mechanisms, a winding lever for said time-clock mechanism, a lever for partially winding said spring and controlling said signal-actuating mechanism, the levers concentrically pivoted, a two-armed lever eccentrically pivoted with respect to said first mentioned levers, means upon one of the arms of said two-armed lever for engagement with said winding lever, for winding said spring to set said clock mechanism, for timed movement, a spring sustained finger upon the other arm of said two-armed lever, engageable with said signal lever when the same is at the limit of movement in one direction, a pin upon said signal lever, a latch lever having respective intermediate and terminal stops thereon engageable by said pin to arrest the movement of said signal lever, means carried by said winding lever for releasing said stop to allow actuation of the clock signal-actuating mechanism, and means manually operable to release said stops independently of a timed release.

8. An electrical signal transmitting device comprising a signal-actuating mechanism, and a time-clock mechanism for controlling said signal-actuating mechanism, a common power-imparting spring for said mechanisms, a winding lever for one terminal of said spring, a signal lever for the opposite terminal thereof, a two-armed lever movable in opposite directions for winding said spring, means upon one of the arms of said lever for engagement with said signal lever for rotating the same in one direction, means upon the other arm of said lever for engagement with said winding lever for rotating the same in a direction opposite that of said signal lever, a pin upon said signal lever, stop means engageable by said pin for limiting rotation of said signal lever, and means upon said winding lever for actuating said stop means to release said signal lever.

9. An electrical signal transmitting device, comprising a signal-actuating mechanism, and a time-clock mechanism for controlling said signal-actuating mechanism, a common power-imparting spring for said mechanisms, levers respectively for each terminal of said spring, said levers operable in relatively opposite directions to wind said spring, a two-armed lever eccentrically pivoted with respect to said first mentioned levers, means upon one arm of said two-armed lever engageable with one of said levers to wind the spring and time-set said lever, and a second resilient arm engageable with said second lever to wind said spring in an opposite stroke of said two-armed lever and to release said second lever at the end of such stroke, stop means for arresting the movement of said second lever after its release, said stop means releasable by said first mentioned lever at the end of a timed period, and additional stop means for arresting the movement of said second lever after a second release.

10. An electrical signal transmitting device, comprising a clockwork signal-actuating mechanism, and a time-clock mechanism for controlling said clock signal-actuating mechanism, a common power-imparting spring for said mechanisms, a clock lever for one terminal of said spring, a signal lever for the other terminal thereof, means engageable with said levers for rotating the same in relatively opposite directions respectively to set said clock lever for time reverse movement and to rotate and release said signal lever for signal transmission, a shaft rotatable by said signal-actuating mechanism, a pair of wheels upon said shaft rotatable with and slidable thereon, a switch opening and closing arm engageable by the teeth of said wheels, and manually operable means for alternately positioning said wheels for engagement with said lever.

11. An electrical signal transmitting device, comprising a signal-actuating mechanism, and a time-clockwork mechanism for controlling said signal-actuating mechanism, a common power-imparting spring for said mechanisms, a winding lever for one terminal of said spring, a signal lever for the opposite terminal thereof, means manually operable for rotating one of said levers in one direction to wind said spring, a reverse stroke of said means rotating a second lever to additionally wind said spring, and means for automatically releasing said second lever at the end of said reverse stroke to cause switch actuation.

12. An electrical signal transmitting device, comprising a clockwork signal-actuating mechanism, and a time-clock mechanism for controlling said clock signal-actuating mechanism, a common power-imparting spring for said mechanisms, levers respectively for each terminal of said spring, said levers relatively concentrically pivoted, and said levers operable in relatively opposite directions to wind said spring, a two-armed lever eccentrically pivoted with respect to said first named levers, one arm thereof engageable with one of said levers to wind said spring and time-set said lever, and the second arm resiliently engageable with the second lever to wind said spring in an opposite stroke and to release said second lever at the end of such stroke, stop means for arresting the movement of said second lever after release, said stop means releasable by said first mentioned lever at the end of a timed period, additional stop means for arresting the movement of said second lever after a second release, and means manually operable for releasing said stop means independently of a timed release.

13. An electrical signal transmitting device, comprising a signal actuating mechanism and a time clock mechanism for controlling said signal actuating mechanism, a common power imparting spring for said mechanisms, a clock winding lever for one terminal of said spring, a signal lever for the opposite terminal thereof, the levers concentrically pivoted, a two-armed lever eccentrically pivoted with respect to the two first-mentioned levers, means upon one of the arms of said two-armed lever for engagement with said clock lever for winding the spring to set said clock mechanism, means upon the other arm of said lever adapted to engage with said signal lever only when the same is in a predetermined position, a pin upon said signal lever, a latch lever having stops thereon engageable by said pin to arrest the movement of said signal lever, a shaft rotatable by said signal actuating mechanism, a pair of wheels upon said shaft rotatable and translatable thereon, and means mounted upon a common shaft manually and simultaneously operable to translate said wheels and to release said stops independently of a timed release.

14. An electrical signal transmitting device comprising a signal actuating mechanism and a time-clock mechanism for controlling said signal-actuating mechanism, a common power imparting spring for said mechanisms, a winding lever for one terminal of said spring, a combined winding and signaling lever for the opposite terminal thereof, said levers relatively concentrically pivoted, a lever eccentrically pivoted with respect to the first-mentioned lever, means upon said eccentrically pivoted lever for engagement with said clock lever for winding said spring to set said clock mechanism, additional means upon said lever engageable with said signal lever, when the same is in a predetermined position, a pin upon said signal lever, a latch lever having respective intermediate and terminal stops thereon engageable by said pin to arrest the movement of said signal lever, means carried by said clock lever for causing a timed release of said stops, to allow actuation of the clock signal-actuating mechanism, and means manually operable to release said stop independently of a timed release.

15. An electrical signal transmitting device, comprising a signal-actuating mechanism and a time-clock mechanism for controlling said signal-actuating mechanism, a common power imparting spring for said mechanisms, a common winding shaft for said mechanism having levers attached thereto, one rotatively and the other non-rotatively, means for engagement with said levers movable in opposite directions for correspondingly operating said levers to wind said spring, a pin upon one of said levers, intermediate and terminal stops engageable by said levers, means for disengaging said stops from said pin, said means comprising a cross shaft having a lever rigidly attached thereto, a second lever engageable with one of the first-mentioned levers for locking said stops against release, means manually operable to release said stops independently of a timed release, a shaft rotatable by said signal-actuating mechanism, a pair of wheels upon said shaft rotatable and slidable thereon, and means upon said shaft simultaneously operable to translate said wheels and to release said stops.

16. In a device of the class described, a clockwork signal transmitting mechanism having a controlling arm engageable for restraining the actuation of said mechanism, and for resetting the same after actuation, a time clock for controlling the operation of said clockwork signal actuating mechanism having an arm for setting the time clock mechanism, a trip member controlled by the arm of said time-clock mechanism controlling the actuation of the controlling arm of said clockwork signal mechanism, and a manually operated member movable for engaging and swinging said arms, respectively to reset positions.

17. In a device of the class described, a clockwork signal transmitting mechanism having a controlling arm engageable for setting and restraining the actuation of said mechanism, a time clock for controlling the operation of said clockwork signal actuating mechanism having an arm for setting and limiting the actuation of the time-clock mechanism, a trip member for restraining the action of the arm of said clockwork signal transmitting mechanism and releasing the same when tripped, controlled by the arm of said time-clock mechanism, and a manually operated member movable for engaging and swinging said arms, respectively, to reset positions.

18. In a device of the class described, a clockwork signal transmitting mechanism having a controlling arm engageable for setting and restraining the actuation of said mechanism, a time clock for controlling the operation of said clockwork signal actuating mechanism having an arm for setting and limiting the actuation of the time-clock mechanism, a trip member for restraining the action of the arm of said clockwork signal transmitting mechanism and releasing the same when tripped, controlled by the arm of said time-clock mechanism, and a manually operated member movable for engaging and swinging said arms, respectively, to reset positions, said arms movable in opposing directions for resetting, whereby said manually operable member is adapted to reset one arm in a forward stroke and the second in a reverse stroke of said member.

In witness whereof, I hereunto subscribe my name.

WALTER S. LUDLOW, Jr.